United States Patent Office 3,268,596
Patented August 23, 1966

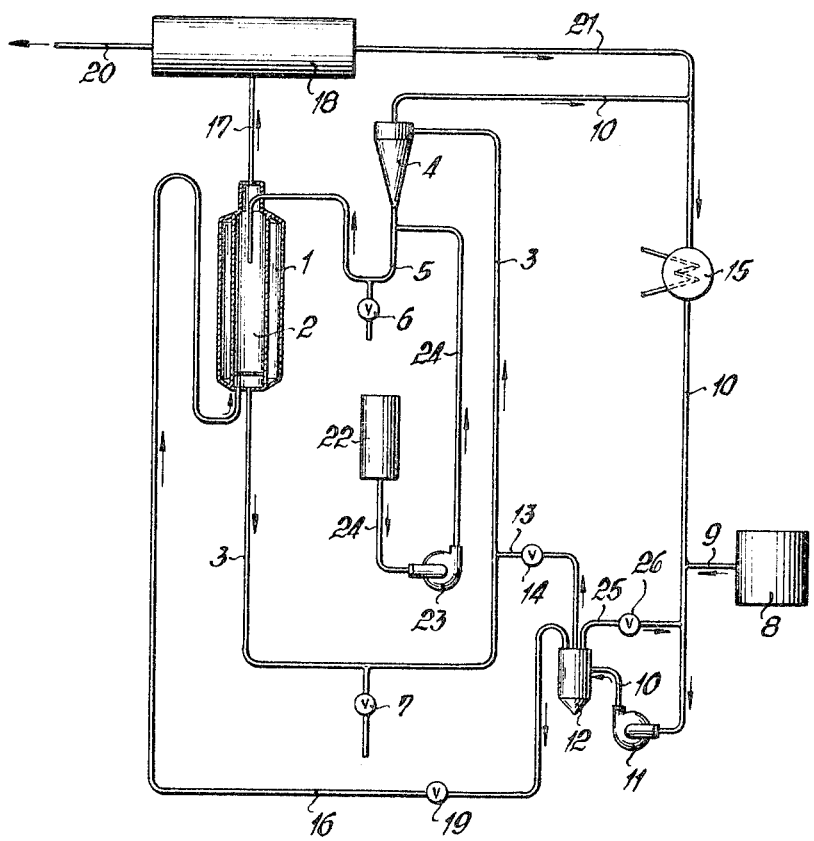

3,268,596
PROCESS FOR THE CONTINUOUS MANUFACTURE OF MONOVINYLACETYLENE
Kurt Sennewald and Wilhelm Vogt, Knapsack, near Cologne, Hans Weiden, Rodenkirchen, near Cologne, and Peter Komischke, Efferen, near Cologne, Germany, assignors to Knapsack-Griesheim Aktiengesellschaft, Knapsack, near Cologne, Germany, a corporation of Germany
Filed Aug. 29, 1963, Ser. No. 305,488
Claims priority, application Germany, Sept. 22, 1962, K 47,786
18 Claims. (Cl. 260—678)

The present invention is concerned with a process for the manufacture of monovinylacetylene in two stages by catalytical dimerization of acetylene in an aqueous-acid solution of cuprous chloride with an alkali metal chloride as a complex-forming agent.

The catalytical dimerization of acetylene into monovinylacetylene has repeatedly been described in the literature with the proposal to use as appropriate catalysts aqueous-acid cuprous chloride catalysts in conjunction with an alkali-metal chloride as a complex-forming agent. U.S. Patent No. 2,191,068 describes a process, wherein acetylene, for example, is introduced continuously into the lower portion of a packed absorption column and intimately contacted therein in counter-current manner with a solution of cuprous chloride and ammonium chloride in hydrochloric acid supplied to the top portion of the absorption column, a portion of the acetylene absorbed being thus transformed into monovinylacetylene and small amounts of by-products, such as divinylacetylene, acetaldehyde, and higher acetylene polymers. From the catalyst solution withdrawn continuously at the bottom portion of the absorption column, the reaction product is expelled in a following stripping column by introducing hot steam thereto, and the condensate obtained is separated into an aqueous layer and an organic layer. The monovinylacetylene dissolved in the organic layer is isolated by distillation. The catalyst solution purified in the stripping column is first heated in a heat exchanger at the necessary reaction temperature of 65 to 75° C., and then introduced again with the help of a catalyst pump into the top portion of the absorption column for use in the dimerization of the acetylene. Analysis of the reaction product obtained in this process indicates that 20 to 25% of the acetylene used has been transformed. The vapors escaping from the stripping column contain about 85% of acetylene, 11% vinylacetylene, 1% acetaldehyde and about 1% higher-boiling organic products. The undesired formation of by-products associated with the use of aqueous cuprous chloride catalysts has been attempted to be reduced in some processes as being a function of the gas charged to the catalyst, the type of the complex-forming agent, the time of residence of the reaction gas on the catalyst or the molar ratio of the cuprous chloride to the complex-forming agent, but these attempts did not result in the yield of monovinylacetylene being noteworthily increased. Further proposals to increase the monovinylacetylene yield aim at the use of special reactors, which are equipped, for example, with stirring means or perforated bottoms intended to ensure an intimate contact between the reaction gas and the catalyst liquid. The improved yields of monovinylacetylene obtainable thereby are, however, disproportional to the technical expenditure involved. In spite of the many variations in the reaction conditions, all the conventional processes basically consist in dimerizing the acetylene in one process stage, the acetylene transformation rate being limited to at most 20 to 25% by volume for a monovinylacetylene content of about 11% by volume in the reaction gas.

The present invention now provides a two-stage process for the manufacture of monovinylacetylene by catalytical dimerization of acetylene with the help of a cuprous chloride/potassium chloride catalyst in aqueous hydrochloric acid, wherein about 25 to 50% of the total amount of acetylene to be transformed is transformed in a first reaction stage, which is operated according to the principle of a mammoth or air-lift pump, and wherein about 50 to 75% of the total amount of acetylene to be transformed is transformed in a second reaction stage, the second reaction stage being designed to serve additionally as a gas wash stage. In carrying out the process of this invention, monovinylacetylene is generally obtained in yields of about 87 to 90%, calculated on the acetylene transformed, for an acetylene conversion rate of 25 to 30% by volume and a catalyst efficiency of up to 40 grams per liter an hour. The average content of monovinylacetylene in the reaction gas amounts to approximately 11.7 to 15.5% by volume.

The process of the present invention is more particularly carried out as follows: in a first reaction stage, acetylene and/or a portion of the acetylene-containing gas mixture obtained in that first reaction stage is introduced under pressure into the ascending portion of a catalyst solution cycle having a cyclone and a heated gas wash tower inserted therein, and partially dimerized into monovinylacetylene, the catalyst solution in the catalyst cycle being kept in motion concurrently therewith by the current of gas introduced thereinto; gaseous constituents of the resulting reaction product and unreacted acetylene are substantially separated from the catalyst solution in the cyclone; a portion of the resulting gas current is returned together with fresh acetylene into the ascending portion of the catalyst cycle, whereas the remaining portion of the gas current is caused to flow through a gas wash tower, serving as a second reaction stage, thereby expelling dissolved constituents of the reaction product from the catalyst solution, which is withdrawn from the cyclone and introduced in the top portion of the gas wash tower, residual acetylene being substantially dimerized concurrently therewith into monovinylacetylene; and a monovinylacetylene-containing gas mixture coming from the gas wash tower is conveyed to a separating means and separated therein by distillation into monovinylacetylene, unreacted acetylene and small amounts of by-products. The acetylene so separated and recovered is advantageously combined with the gas current coming from the cyclone and introduced again into the catalyst cycle.

In carrying out the process of the present invention, it has proved advantageous to introduce the acetylene or the acetylene-containing gas mixture under a pressure of about 1000 to about 1500 mm. mercury, preferably 1100 mm. mercury, into the ascending portion of the catalyst cycle and to maintain the catalyst solution in permanent motion. The catalyst used may be a cuprous chloride/potassium chloride solution in aqueous hydrochloric acid, the solution containing the cuprous chloride and potassium chloride in the molar ratio of approximately 1:1 and hydrochloric acid in a concentration of about 0.1 to about 0.15% by weight. The catalyst solution is heated in the heated gas wash tower at a temperature of about 60 to 75° C. and conveyed, in a manner analogous to the principle of an air-lift pump, by the acetylene-containing gas mixture introduced into the ascending portion of the cycle. The catalyst cycle itself, through which the catalyst solution flows about 160 times per hour, is formed by the gas wash tower, a descending catalyst conduit and ascending catalyst conduit, the cyclone and a siphon-like connecting line disposed between the cyclone and the gas wash tower.

The amount of gas continuously withdrawn from the cyclone, which is maintained therein under a pressure of about 800 to 1200 mm. mercury, preferably about 900 to 1050 mm. mercury, and contains monovinylacetylene in addition to small proportions of divinylacetylene, acetaldehyde and vinyl chloride, is introduced, if desired after previous cooling, partially into the ascending portion of the catalyst cycle and partially into the gas wash tower, the ratio by volume of the two partial gas currents being about 2:1 to 10:1, preferably about 5:1. In the event of a catalyst load per hour of about 40 to 160 litres, for example 80 litres gas per litre of catalyst solution in the gas wash tower, about 200 to 800 litres, for example 400 litres, gas per litre of catalyst solution are required to be introduced within the same period of time into the ascending portion of the catalyst cycle in the first reaction stage. The proportion of gas branched off after leaving the first reaction stage and introduced into the gas wash tower is replaced with at least the equal portion by volume of fresh acetylene coming from an acetylene reservoir. The catalyst solution is stripped off in the gas wash tower, in a manner analogous to the introduction of the acetylene-containing gas into the first reaction stage, under a pressure of at most 1000 mm. mercury, preferably 800 to 850 mm. mercury, a catalyst solution rich in dissolved monovinylacetylene and possible by-products being withdrawn from the gas wash tower.

As compared with the conventional one-stage methods, the process of the present invention offers numerous advantages which ultimately result in the increased yields of monovinylacetylene or an increased acetylene conversion rate. A substantial advantage offered by the present invention consists, for example, in the use of a gas wash tower to serve as the second reaction stage which is not only intended for freeing the catalyst solution from the reaction products dissolved therein by stripping, but is also intended to ensure that the residual acetylene still contained in the reaction gas obtained in the first reaction stage is subjected anew to transformation. In spite of this additional reaction, the catalyst solution withdrawn from the gas wash tower contains but small amounts of impurities boiling at a higher temperature than monovinylacetylene, so that the catalyst solution can immediately be returned to the first processing stage.

Not less important than the double function of the gas wash tower is the proposed delivery of the catalyst, which is delivered pneumatically rather than by means of a liquid pump as used previously, so that there are no sealing problems or problems relating to material. The pneumatic delivery of the catalyst liquid results simultaneously in the acetylene being thoroughly mixed with the catalyst which in turn has an advantageous effect on the monovinylacetylene yield and obviates the use of costly mechanical stirring means as proposed in the conventional methods. The separation of the reaction products and of unreacted acetylene from the catalyst solution in the cyclone is substantially promoted by the current of gas introduced into the first reaction stage, the gas current stripping off the dissolved constituents of the reaction product from the catalyst solution in the ascending portion of the catalyst cycle to such an extent that catalyst solution deprived of monovinylacetylene, divinylacetylene and acetaldehyde is always introduced into the top portion of the gas wash tower. In other words, the catalyst solution contains the reaction products before the gas wash tower in a concentration lower than in the descending portion of the catalyst cycle. The concentration values for the reaction products contained in two catalyst samples withdrawn before and after the gas wash tower, respectively, are compared in the following Table I, in which column A indicates the composition of the reaction mixture in the catalyst before the gas wash tower and column B after the gas wash tower in the descending portion of the catalyst cycle.

TABLE I

| | A (percent by weight) | B (percent by weight) |
|---|---|---|
| Acetylene | 76.8 | 69.2 |
| Monovinylacetylene | 17.8 | 24.7 |
| Divinylacetylene | 2.29 | 2.74 |
| Acetaldehyde | 1.33 | 3.35 |

In the preparation of monovinylacetylene by catalytical dimerization of acetylene, the formation of cuprene tar as a by-product is known to be very disadvantageous. In the process of the present invention, the content of resinous cuprene compounds is restricted to at most 0.1% by weight, preferably 0.02 to 0.04% by weight, calculated on the amount of monovinylacetylene obtained, the short residence times of the reaction gas in the two reaction stages limiting the oligo-polymerization of acetylene.

Finally, the process of the present invention offers the particular advantage that the acetylene transformation rate and therewith the monovinylacetylene yield can be influenced by variation of the process, i.e. by increasing under otherwise constant reaction conditions the acetylene gas pressure in the first reaction stage or by increasing the proportion of gas supplied to the gas wash tower without the proportion of reaction gas conveyed to the separating means being changed.

An exemplary mode of executing the process of the present invention is now described with reference to the accompanying flow scheme. Aqueous catalyst solution is so introduced through a gas wash tower 2 provided with a heating jacket 1 into the catalyst cycle conduit 3 that the ascending portion thereof is filled with catalyst solution to an extent of approximately 65%. In addition to gas wash tower 2, a cyclone 4 is inserted in the cycle conduit 3 which is closed by a siphon 5 arranged between gas wash tower 2 and cyclone 4. Siphon 5 is provided with an outlet valve 6 for sampling. A second outlet valve 7 is disposed in the descending portion of cycle conduit 3. Monovinylacetylene is prepared by first supplying a pre-determined portion of acetylene coming from gas container 8 through line 9 to gas cycle conduit 10 and then introducing the acetylene under superatmospheric pressure with the aid of gas circulating pump 11 through blast pressure tank 12 and conduit 13 into the ascending portion of the catalyst cycle conduit 3. Conduit 13 is equipped with a regulating valve 14 for measuring the acetylene supplied. In order to avoid excessive pressure increase, the blast pressure tank is connected through conduit 25 to gas cycle conduit 10, conduit 25 being provided with a relief valve. In the ascending portion of cycle conduit 3, the acetylene introduced is partially transformed into monovinylacetylene and small amounts of divinyl-acetylene, acetaldehyde and vinyl chloride, the catalyst solution being cycled by the velocity of the flowing gas. The gaseous reaction mixture formed in the ascending portion of cycle conduit 3 and unreacted acetylene are separated in cyclone 4 and, after having previously been cooled in cooler 15, partially supplied through conduits 10 and 13 to the ascending portion of cycle conduit 3, whereas the remaining portion of the gas mixture is caused to travel from blast pressure tank 12 through conduit 16 into the lower portion of gas wash tower 2 and intimately contacted therein with the catalyst solution withdrawn from cyclone 4 and introduced through siphon 5 into gas wash tower 2. The two gas currents introduced into cycle conduit 3 and gas wash tower 2, respectively, are measured by means of regulating valves 14 and 19. In gas wash tower 2, the residual acetylene is dimersized while dissolved constituents of the reaction product are removed from the catalyst solution concurrently therewith by stripping. Monovinylacetylene-containing reaction gas is conveyed from gas wash tower 2 through off-gas pipe 17 into separating means 18 and separated therein by distillation into monovinylacetylene, residual acetylene and by-products. Monovinylacetylene is withdrawn through conduit 20, whereas the acetylene recovered is returned through line 21 into gas cycle conduit 10 to be again reacted and transformed therein. The density and acidity of the catalyst solution are regulated by supplying the catalyst cycle with dilute hydrochloric acid coming from storage tank 22, the acid being supplied with the help of pump 23 and through conduit 24.

The following examples serve to illustrate the invention, but they are not intended to limit it thereto:

*Example 1*

1.6 litres of a catalyst solution (density $d_{80°\,C.}$: 1.6 grams/cc.) composed of

| | Mols |
|---|---|
| Water | 56.6 |
| Cuprous chloride | 8.64 |
| Potassium chloride | 8.64 |
| Hydrochloric acid | 0.08 | were caused to flow into cycle conduit 3 through gas wash tower 2 which had an internal diameter of 5 cm., a height of 120 cm., was filled up to a height of 100 cm. with glass rings 5 mm. wide, and heated by heating jacket 1. The descending portion of cycle conduit 3 was 265 cm. long and the ascending portion thereof was 445 cm. long, the conduit itself being 1.3 cm. wide. In the ascending portion of cycle conduit 3, the catalyst solution was charged, per hour, with 630 litres acetylene or the acetylene containing mixture withdrawn from cyclone 4 maintained under a pressure of 1100 mm. mercury, gaseous reaction products were separated from the catalyst solution under a pressure of 910 mm. mercury in cyclone 4 which was 12 cm. wide and 19 cm. high, and the catalyst solution was introduced into gas wash tower 2 through siphon 5 50 cm. long. The catalyst liquid was caused to travel 160 times per hour through the prescribed cycle. Of the amount of gas, containing acetylene, monovinylacetylene, divinylacetylene, acetaldehyde and vinyl chloride, supplied per hour to blast pressure tank 12 through gas cycle conduit 10, 131 litres were introduced under a pressure of 835 mm. mercury and through conduit 16 into gas wash tower 2 and used therein for contact-catalytical transformation and for removal of gaseous reaction products formed in the catalyst by stripping at 59.7° C. The initial gas volume in the ascending portion of cycle conduit 3 was restored by supplying gas cycle 10 through conduit 9 with a proportion of fresh acetylene equal by volume to the proportion of gas removed. Under these conditions, the gas charged per litre of catalyst solution and per hour in the gas wash tower amounted to 82 litres, whereas the catalyst solution in the ascending portion of cycle conduit 3 was charged per hour with 394 litres gas per litre of catalyst. The amount of gas put through in gas wash tower 2 and the amount of gas put through in the ascending portion of cycle conduit 3 were thus in the ratio of 1:4.8. After 72 hours of operation, the concentration of monovinylacetylene was found to be 2.9% by volume in the gas current withdrawn from cyclone 4 and 11.7% by volume in the off-gas coming from conduit 17. Gas-chromatographical analysis of the off-gas coming from conduit 17 indicated that the ratio by weight of monovinylacetylene to divinylacetylene was 9.15:1. For an acetylene transformation rate of 22.6% by volume and for a catalyst efficiency of 33.3 grams/hr. monovinylacetylene per 1.6 litres catalyst solution, the monovinylacetylene yield ($A_1$) amounted to 89.9% calculated on the acetylene transformed into monovinylacetylene plus divinylacetylene. Calculated on the acetylene transformed into monovinylacetylene, divinylacetylene, acetaldehyde and vinyl chloride, the monovinylacetylene yield ($A_2$) was 88.8%.

*Examples 2 to 7*

The results obtained in working Examples 2 to 7 are compiled in the following Tables II and III. They show the influence of pressure and temperature variation on the composition of the reaction product under otherwise the same reaction conditions as those used in Example 1.

TABLE II

| Ex. | Gas pressure (in mm. mercury) in— | | Catalyst temperature, °C. | Acetylene conversion, percent by vol. | $C_4H_4$ (in percent by volume) in— | | Ratio by weight of $C_4H_4$ to $C_6H_6$ in off-gas of wash tower | $C_4H_4$-yields in percent | |
|---|---|---|---|---|---|---|---|---|---|
| | Cyclone | Gas wash tower | | | Cycle gas | Off-gas of wash tower | | $A_1$ | $A_2$ |
| 2 | 930 | 835 | 60.5 | 25.0 | 4.1 | 12.5 | 8.60:1 | 89.3 | 88.3 |
| 3 | 965 | 835 | 60.0 | 26.8 | 5.4 | 13.4 | 7.66:1 | 88.2 | 87.4 |
| 4 | 985 | 835 | 60.5 | 28.7 | 6.7 | 14.6 | 7.82:1 | 88.5 | 87.1 |
| 5 | 1,005 | 835 | 60.5 | 30.5 | 7.9 | 15.5 | 6.88:1 | 87.4 | 86.3 |

TABLE III

| Ex. | Catalyst temperature in °C. | Gas pressure in cyclone, mm. mercury | Composition of off-gas coming from wash tower | | | | | Acetylene conversion in percent by volume | $C_4H_4$-yields in percent | |
|---|---|---|---|---|---|---|---|---|---|---|
| | | | $C_2H_2$ | $C_4H_4$ | $C_6H_6$ | $CH_3CHO$ | $CH_2=CHCl$ | | $A_1$ | $A_2$ |
| 5 | 60.5 | 1,005 | 82.0 | 15.5 | 1.49 | 0.4 | 0.07 | 30.5 | 87.4 | 86.3 |
| 6 | 68.0 | 1,005 | 82.6 | 15.2 | 1.7 | 1.0 | 0.07 | 30.7 | 85.7 | 83.2 |
| 7 | 75.0 | 1,005 | 80.8 | 15.8 | 1.8 | 1.2 | 0.04 | 32.1 | 85.4 | 82.6 |

$C_2H_2$=acetylene. $C_4H_4$=monovinylacetylene. $C_6H_6$=divinylacetylene. $CH_3CHO$=acetaldehyde. $CH_2CHCl$=vinyl chloride.

The claims:

1. A process for the continuous manufacture of monovinylacetylene by catalytical dimerization of acetylene at an elevated temperature in an aqueous-acid cuprous chloride solution serving as the catalyst, wherein, in a first reaction stage, acetylene is introduced under pressure into the ascending portion of a catalyst solution cycle having a gas separating stage and a heated gas wash stage inserted therein, and partially dimerized into monovinylacetylene, the catalyst solution flowing in the catalyst solution cycle being kept in motion concurrently therewith by the acetylene gas introduced thereinto; gaseous constituents of the resulting reaction product and unreacted acetylene are substantially separated from the catalyst solution in the gas separating stage; a portion of an acetylene-containing gas mixture obtained in that gas separating stage is returned together with fresh acetylene into the ascending portion of the catalyst solution cycle, whereas the remaining portion of the said acetylene-containing gas mixture is caused to flow into the lower portion of the gas wash stage serving as a second reaction stage thereby expelling dissolved constituents of reaction product from the catalyst solution, which is withdrawn from the gas separating stage and introduced into the top portion of the gas wash stage, residual acetylene being substantial dimerized concurrently therewith into monovinylacetylene; and gas mixture coming from the gas wash stage is conveyed to a separating stage and separated therein by distillation into monovinylacetylene, unreacted acetylene and small amounts of by-products.

2. The process of claim 1, wherein at least one member selected from the group consisting of acetylene gas and an acetylene-containing gas mixture is introduced into the ascending portion of the catalyst solution cycle under a pressure within the range of about 1000 to about 1500 mm. mercury.

3. The process of claim 2, wherein the gas introduced into the ascending portion of the catalyst solution cycle is maintained under a pressure of about 1100 mm. mercury.

4. The process of claim 1, wherein the catalyst solution is separated in the gas separating stage under a pressure within the range of about 800 to 1200 mm. mercury.

5. The process of claim 4, wherein a pressure within the range of about 900 to 1050 mm. mercury is maintained in the gas separating stage.

6. The process of claim 1, wherein the proportion of fresh acetylene introduced into the catalyst solution cycle is at least equal by volume to the proportion of gas introduced into the gas wash stage.

7. The process of claim 1, wherein the aqueous-acid catalyst solution is caused to flow through the catalyst solution cycle at the rate of at least 160 times per hour.

8. The process of claim 1, wherein the proportion of gas introduced into the ascending portion of the catalyst solution cycle and the proportion of gas introduced into the gas wash stage are in a ratio by volume of about 2:1 to about 10:1.

9. The process of claim 8, wherein the ratio by volume of the gas introduced into the catalyst solution cycle and the gas wash stage, respectively, is about 5:1.

10. The process of claim 1, wherein the catalyst solution flowing in the ascending portion of the catalyst cycle is charged, per hour, with about 200 to 800 litres gas per litre of catalyst solution.

11. The process of claim 10, wherein the catalyst solution flowing in the ascending portion of the catalyst solution cycle is charged, per hour, with about 400 litres gas per litre of catalyst solution.

12. The process of claim 1, wherein the catalyst solution flowing in the gas wash stage is charged, per hour, with about 40 to 160 litres gas per litre of catalyst solution.

13. The process of claim 12, wherein the catalyst solution flowing in the gas wash stage is charged, per hour, with about 80 litres gas per litre of catalyst solution.

14. The process of claim 1, wherein the catalyst solution is heated in the gas wash stage at a temperature within the range of about 60 to 75° C.

15. The process of claim 1, wherein the gas introduced into the gas wash stage is maintained under a pressure of at most 1000 mm. mercury.

16. The process of claim 15, wherein the gas introduced into the gas wash stage is maintained under a pressure within the range of about 800 to 850 mm. mercury.

17. The process of claim 1, wherein the acetylene separated and recovered in the separating stage is combined with the acetylene-containing gas mixture withdrawn from the gas separating stage.

18. The process of claim 1, wherein the catalyst solution is an aqueous-acid cuprous chloride/potassium chloride solution containing cuprous chloride and potassium chloride in the molar ratio of about 1:1 and hydrochloric acid in a concentration of about 0.1 to 0.15% by weight.

References Cited by the Examiner
UNITED STATES PATENTS

| | | | |
|---|---|---|---|
| 2,145,058 | 1/1939 | Stadler | 260—678 |
| 2,191,068 | 2/1940 | Carter et al. | 260—678 |
| 2,191,088 | 2/1940 | Stadler et al. | 260—678 |
| 2,759,985 | 8/1956 | Root | 260—678 |
| 3,093,696 | 11/1963 | Sennwald | 260—678 |
| 3,147,312 | 9/1964 | Johnson et al. | 260—678 |

ALPHONSO D. SULLIVAN, *Primary Examiner.*